(12) United States Patent
Nishigaki et al.

(10) Patent No.: US 8,154,667 B2
(45) Date of Patent: Apr. 10, 2012

(54) DIGITAL PLANETARIUM PICTURE-PROJECTING APPARATUS

(75) Inventors: Junji Nishigaki, Toyokawa (JP); Kenichi Hyodo, Toyokawa (JP)

(73) Assignee: Konica Minolta Planetarium Co., Ltd., Osaka (JP)

(*) Notice: Subject to any disclaimer, the term of this patent is extended or adjusted under 35 U.S.C. 154(b) by 1525 days.

(21) Appl. No.: 11/634,760

(22) Filed: Dec. 6, 2006

(65) Prior Publication Data
US 2007/0132892 A1   Jun. 14, 2007

(30) Foreign Application Priority Data

Dec. 8, 2005 (JP) ................................. 2005-354794
Sep. 29, 2006 (JP) ................................. 2006-268552

(51) Int. Cl.
*H04N 5/64* (2006.01)

(52) U.S. Cl. ...................... 348/744; 348/36; 348/E5.137
(58) Field of Classification Search ..................... 348/36, 348/744, E5.137; 352/13, 47; 353/21; 345/619; 381/56
See application file for complete search history.

(56) References Cited

U.S. PATENT DOCUMENTS

| | | | | |
|---|---|---|---|---|
| 3,596,379 A * | 8/1971 | Faulkner | ........................ | 434/286 |
| 3,863,363 A * | 2/1975 | Miyajima | ...................... | 434/286 |
| 5,682,196 A * | 10/1997 | Freeman | ........................ | 725/139 |
| 6,788,983 B2 * | 9/2004 | Zheng | ............................. | 700/94 |
| 6,798,921 B2 * | 9/2004 | Kinjo | ............................. | 382/282 |
| 7,061,477 B1 * | 6/2006 | Noguchi | ........................ | 345/204 |
| 2002/0073417 A1 * | 6/2002 | Kondo et al. | ................... | 725/10 |
| 2002/0106130 A1 * | 8/2002 | Yokonuma | ..................... | 382/232 |
| 2005/0001938 A1 * | 1/2005 | Koba | ............................. | 348/744 |
| 2005/0157387 A1 * | 7/2005 | Okano et al. | ................... | 359/443 |
| 2006/0013508 A1 * | 1/2006 | Morichika | ..................... | 382/312 |
| 2006/0285150 A1 * | 12/2006 | Jung et al. | ..................... | 358/1.15 |
| 2006/0290781 A1 * | 12/2006 | Hama | ............................. | 348/135 |
| 2007/0008344 A1 * | 1/2007 | Medina | ......................... | 345/647 |
| 2007/0030455 A1 * | 2/2007 | Inoue | ............................. | 353/15 |

FOREIGN PATENT DOCUMENTS

JP             58-132780 A      8/1983

\* cited by examiner

*Primary Examiner* — Alina N. Boutah
(74) *Attorney, Agent, or Firm* — Cozen O'Connor

(57) ABSTRACT

It is intended to provide a digital planetarium picture-projecting apparatus capable of recording and executing an operation procedure, facilitating recording of the operation procedure, editing the operation procedure, and executing an ad-lib representation when the operation procedure is executed. The digital planetarium picture projecting apparatus comprises an operating portion which accepts an operation by an operator about picture projection, an operation display panel which displays information about picture projection to the operator, a manual process recording portion which records an operation procedure executed to the operating portion, and a control portion which executes picture projection according to the operation procedure recorded in the manual process recording portion, wherein a temporary stop or restart operation by the operator is accepted during recording of the operation procedure by the manual process recording portion. Further, information about a projection screen is displayed on an operation display panel during execution of picture projection according to the operation procedure.

13 Claims, 19 Drawing Sheets

FIG. 5

PROCEDURE RECORD 1

FIRST PROCESS: | TIME SETTING [2006/1/1 0:0:0]

↓

SECOND PROCESS: | PLACE SETTING [139.550 36.000 50]

↓

THIRD PROCESS: | TIME CHANGE [SPEED+4 4.1SEC.]

↓

FOURTH PROCESS: | SUN(CELESTIAL BODY NAME) ON

↓

FIFTH PROCESS: | MOON(CELESTIAL BODY NAME) ON

| SCREEN | STANDBY TIME | PROCESS |
|---|---|---|
| TIME/PLACE, ON EARTH, DAY/TIME SETTING | 12500 | TIME SETTING, SET TO, 2006, 1, 1, 0, 0, 0 |
| TIME/PLACE, ON EARTH, PLACE SETTING | 7100 | PLACE SETTING, SET TO, 139, 21, 35, 21, 5 |
| TIME/PLACE, ON EARTH, STANDARD | 5100 | SPEED SETTING, SET TO, 4100 |
| SOLAR SYSTEM, SUN | 900 | NAME, TRUE |
| SOLAR SYSTEM, MOON | 5300 | NAME, TRUE |
| TIME/PLACE, ON EARTH, STANDARD | 5000 | SPEED SETTING, SET TO, 1000 |

FIG. 17

```
SimulationTimeScreen("2006/1/1 0:0:0");
sleep(12.5);
ObserverlocationScreen("Location(139,21,35,21,5)");
sleep(7.1);
TripSpeedScreen(4.1);
sleep(5.1);
SunNameScreen("True");
sleep(0.9);
MoonNameScreen("True");
sleep(5.3);
TripSpeedScreen(1.0);
sleep(5.0);
```

FIG. 18

This is the sign of ooo (name of the constellation).
The brightest one is...

FIG. 19

| | | | |
|---|---|---|---|
| FIRST PROCESS | CONSTELLATION PICTURE ON : (0SEC.) | STANDBY TIME : 3SEC. | 0SEC. |
| SECOND PROCESS | CONSTELLATION PICTURE OFF : (0SEC.) | STANDBY TIME : 5SEC. | 3SEC. |
| THIRD PROCESS | TIME CHANGE ON : 2SEC. | STANDBY TIME : 3SEC. | 8SEC. |
| FOURTH PROCESS | CONSTELLATION LINE ON : (0SEC.) | STANDBY TIME : 0SEC. | 13SEC. |
| FIFTH PROCESS | CONSTELLATION NAME ON : (0SEC.) | STANDBY TIME : 2SEC. | 13SEC. |
| SIXTH PROCESS | COORDINATE ON : (0SEC.) | STANDBY TIME : 1SEC. | 15SEC. |

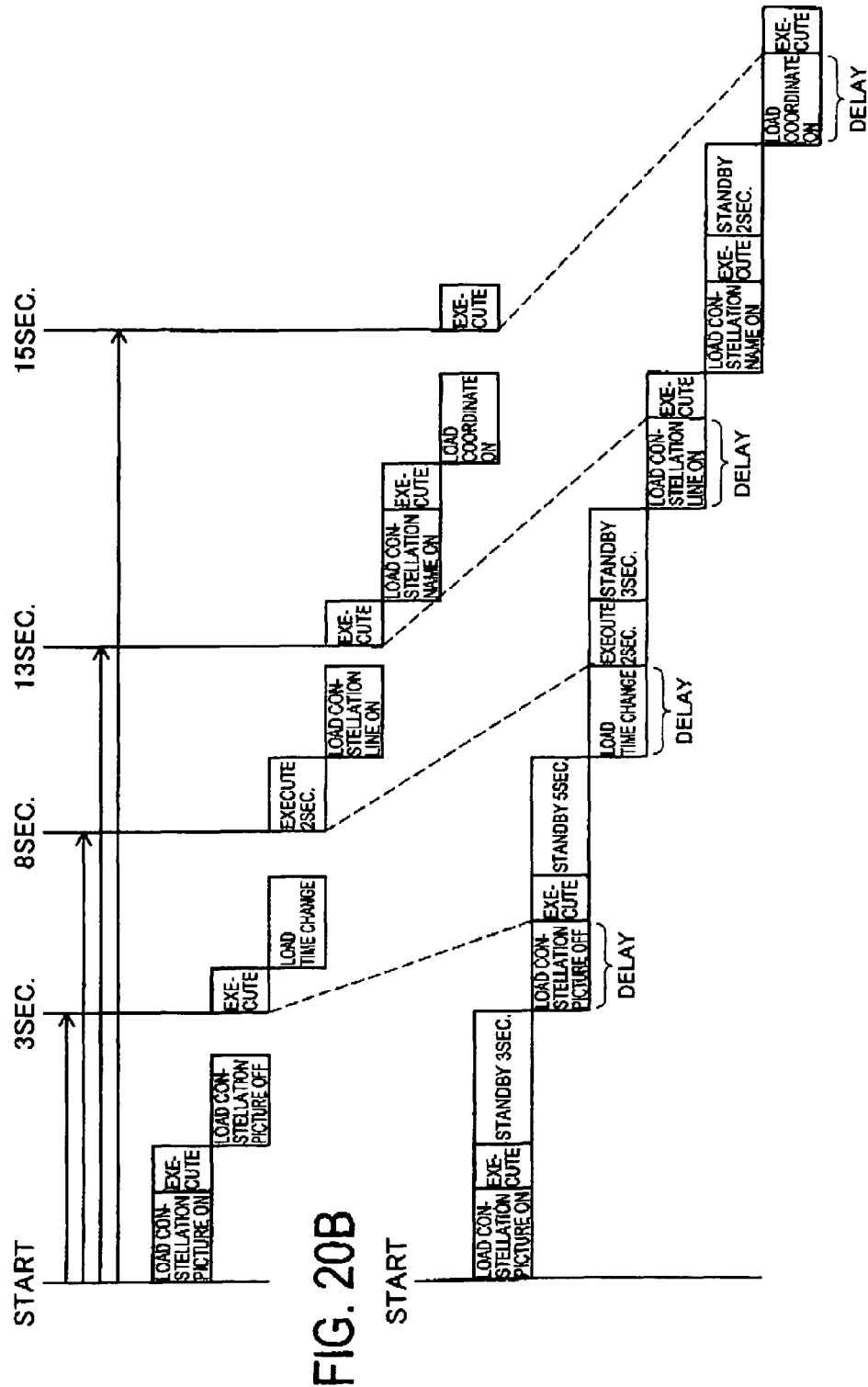

DIGITAL PLANETARIUM PICTURE-PROJECTING APPARATUS

CROSS-REFERENCE TO RELATED APPLICATIONS

This application is based upon and claims the benefit of priority from the prior Japanese Patent Applications No. 2005-354794 filed on Dec. 8, 2005 and No. 2006-268552 filed on Sep. 29, 2006, the entire contents of which are incorporated herein by reference.

BACKGROUND OF THE INVENTION

1. Field of the Invention

The present invention relates to a digital type planetarium picture-projecting apparatus (hereinafter referred to as digital planetarium picture-projecting apparatus). More specifically, the invention relates to a digital planetarium picture-projecting apparatus capable of recording an operation execution procedure, timing and the like.

2. Description of the Related Art

Conventionally, in representation with a planetarium picture-projecting apparatus, celestial bodies or auxiliary pictures for interpretation are projected onto a dome shaped screen while voice interpretation is broadcasted at the same tine. A skilled operator represents considering reactions of spectators and the like by broadcasting voice interpretation while operating the planetarium apparatus. However, the number of skilled operators is limited so that it has been demanded that some extent of representation can be carried out by even an unskilled operator. As a countermeasure for this problem, automatic representing method of the planetarium has been disclosed in, for example, JP Unexamined Patent Publication No. 58-132780. According to the method of this document, the operation by a skilled operator is recorded in a magnetic tape and then, that operation can be executed by correcting the record partially according to a program.

In recent years, in the digital type planetarium picture-projecting apparatus, the representing content which can be executed has been diversified as compared to a conventional optical type planetarium picture projecting apparatus. On the other hand, the operation thereof has been made easy by using such an input device as joystick, touch panel. For example, a variety of representation such as expression of diurnal motion, annual motion and precession movement, expression of intrinsic motion inherent of a fixed star, expression of movement path retaining light trace of a star are possible by using a time tuning volume, a time varying button, a selecting button to select whether or not to indicate various functions, a view point moving button, and the like. Further, not only fixed stars but also celestial bodies such as planets, satellites, comets, asteroids, galaxies, nebulae, star clusters and the like can be projected by using recorded celestial body coordinates and view point coordinates for real time calculation and pseudo space travel can be represented by moving the view point to those celestial bodies.

Conventionally, some digital planetarium picture-projecting apparatus has so-called "macro function" which records a predetermined series of operations as a function which allows an unskilled operator to execute a high performance representation. Using the macro function enables the unskilled operator to execute the high performance representation only by selecting the recorded macro appropriately. Further, there have been available an apparatus having so-called "programming function" which programs a plurality of instructions and records those as a script composed of program language, an apparatus capable of reproducing an animation with voice and the like.

However, the digital planetarium picture-projecting apparatus having the macro function cannot interrupt recording of the macro once it starts. Thus, if one operation is mistaken halfway of the recording, the recording must be started again from the beginning. It is difficult for an unskilled operator to operate smoothly. Thus, recording of a series of operations as a macro all at once is not easy for such an unskilled operator.

Further, in recent years, representing with change in time, movement of view point and the like has been carried out by operating volume knobs, joystick and the like. However, only operations which can be set through a control panel (for example, operation to turn ON/OFF an indication in a display) can be registered as the macro function. Thus, a variety of input operations such as operations of the volume knob, joystick need to be carried out by the operator and not everybody can operate.

Further, the content of the operation screen is not changed over when the macro is reproduced. Thus, the operator cannot know a passage condition by manual operation so that he cannot grasp a reproduced portion. Even if the macro is interrupted or stopped during reproduction, the operation screen does not show the passage condition. Thus, the operator cannot change over to manual operation smoothly, so that the representation makes spectators unpleasant.

Further, in a digital planetarium picture-projecting apparatus having the programming function, the operator needs to acquire a programming technique which is a completely different skill from the operating of the planetarium apparatus. Thus, even an operator skilled in operation of the planetarium apparatus cannot always achieve programming in a short period.

In a method for reproducing a movie, all a series of representation are recorded as pictures and part of them cannot be changed or corrected during an execution. Further, in execution of such a program and movie, its execution content and progress speed are determined preliminarily, so that once the execution is started, its representation cannot be changed or modified corresponding to reaction of the spectators.

SUMMARY OF THE INVENTION

The present invention has been attempted to solve at least one of the above-noted problems involved in the digital planetarium picture-projecting apparatus. Thus, an object of the invention is to provide a digital planetarium picture-projecting apparatus capable of: recording and executing an operation procedure; facilitating recording of the operation procedure; editing a recoded content; and executing an ad-lib representation when operation procedure is actually executed.

According to the present invention, the inventive digital planetarium picture-projecting apparatus essentially comprises: an operation accepting portion for accepting a picture-projection-related operation by an operator; a display screen for displaying the operator picture-projection-related information; an operation-order recording portion for recording an operation procedure accepted by the operation accepting portion; and a reproducing portion for executing picture projection in accordance with the operation procedure recorded in the operation-order recording portion.

The inventive digital planetarium picture-projecting apparatus further comprises: a temporary-stop accepting portion for accepting a temporary-stop operation by the operator when an operation procedure is being recorded with the operation-order recording portion; and a restart accepting portion for accepting a restart operation by the operator when recording of an operation procedure is temporarily stopped by the temporary-stop accepting portion. Since the temporary-stop accepting portion and the restart accepting portion are provided with the digital planetarium picture-projecting apparatus, recording of an operation procedure can be stopped temporarily. Even though representation operation cannot be performed smoothly, recording itself is easy. For example, an operator can check out next operation by a temporary-stop operation. There is thus realized a digital planetarium picture-projecting apparatus capable of recording and executing an operation procedure, especially facilitating recording of operation procedures.

BRIEF DESCRIPTION OF THE DRAWINGS

These and other objects and advantages of this invention will become more fully apparent from the following detailed description taken with the accompanying drawings in which:

FIG. 5 is an explanatory diagram showing an example of procedure recording;

FIG. 6 is an explanatory diagram showing an example of data table for procedure recording;

FIG. 17 is an explanatory diagram showing an example of data for screen recording;

FIG. 18 is an explanatory diagram showing an example of narration display screen;

FIG. 19 is a diagram showing an example of procedure recording, and

FIG. 20 is a time chart for execution of the procedure recording.

DETAILED DESCRIPTION OF THE PREFERRED EMBODIMENT

Hereinafter, the preferred embodiments of the present invention will be described in detail with reference to the accompanying drawings. In this embodiment, the present invention is applied to a digital planetarium picture-projecting apparatus for projecting a picture such as a starry sky onto a dome screen based on picture information.

Figure 1:
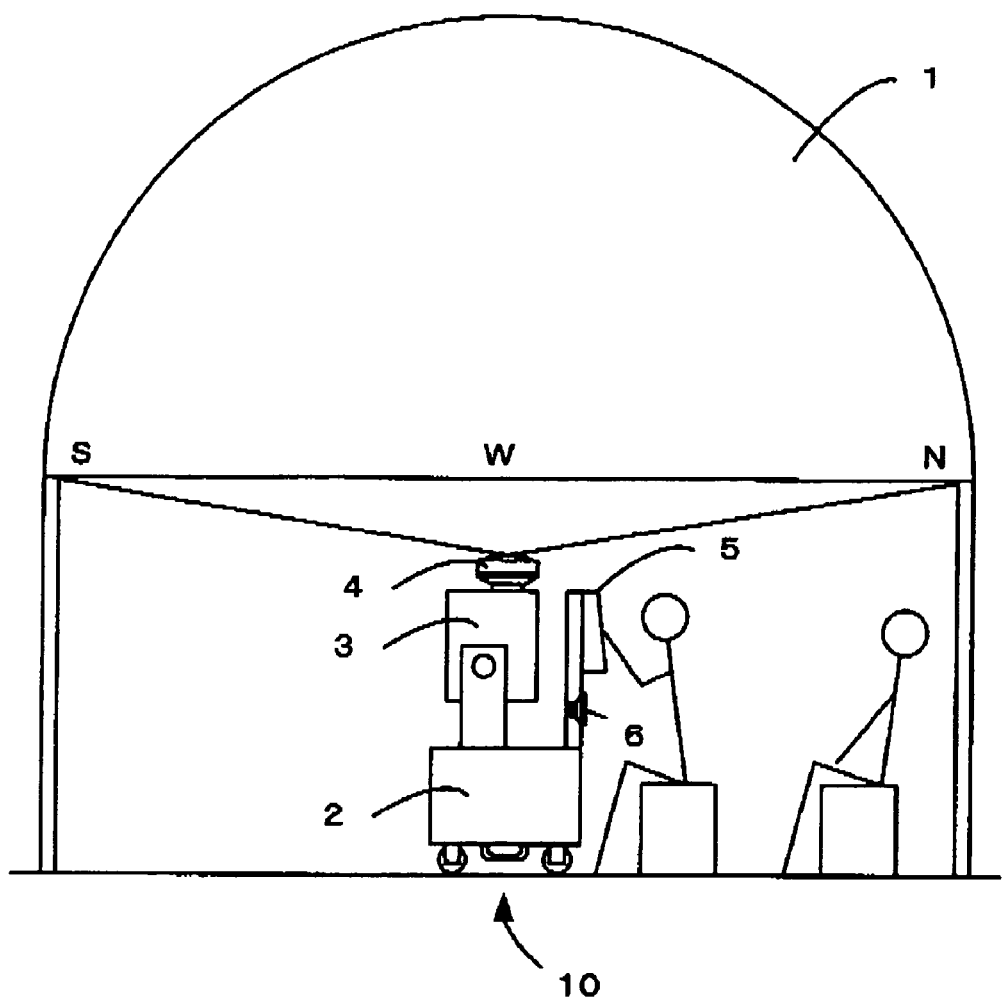
FIG. 1 is a schematic structure drawing of a planetarium picture-projecting apparatus.

The planetarium picture-projecting apparatus of this embodiment comprises a dome screen 1 and a picture-projecting unit 10 installed on the bottom in the center thereof as shown in FIG. 1. The picture-projecting unit 10 comprises a picture control portion 2, a picture-projecting portion 3, a fish-eye lens 4, an operating portion 5 and a speaker with microphone 6. The picture control portion 2 controls pictures projected onto the dome screen 1 and sound to be broadcasted into the planetarium facility and the like. Pictures are projected onto the entire dome screen 1 through the picture-projecting portion 3 and the fish-eye lens 4. Sound is broadcasted into the planetarium facility through the speaker with microphone 6. The operating portion 5 includes a control panel and the like for an operator to operate the planetarium picture-projecting apparatus.

Figure 2:
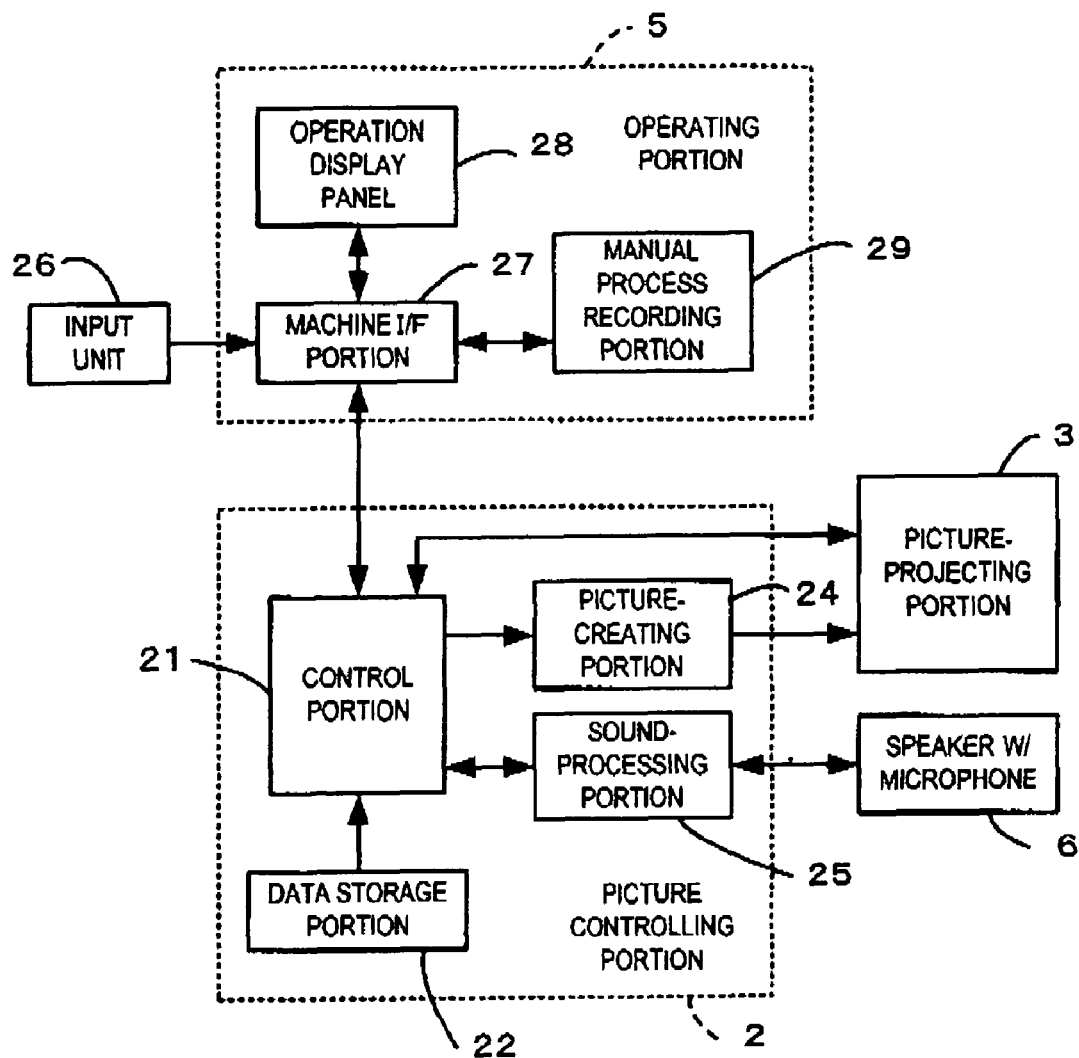
FIG. 2 is a block diagram showing the system configuration of the planetarium picture-projecting apparatus.

The picture control portion 2 of the planetarium picture-projecting apparatus shown in FIG. 1 comprises a control portion 21, a data storage portion 22, a picture-creating portion 24 and a sound-processing portion 25 as shown in FIG. 2. The control portion 21 executes picture control, sound control, illumination control and the like following instructions from the operating portion 5. Further, the control portion 21 can change over display on the operation display panel 28 of the operating portion 5. The data storage portion 22 stores a variety of data necessary for control, and files about pictures, sounds and the like necessary for picture projection, for example, brightness of each celestial body, information of intrinsic motion, names and arrays of respective constellations and the like. The picture-creating portion 24 creates a picture to be projected onto the dome screen 1. A created picture is sent to the picture-projecting portion 3 and projected onto the dome screen 1. The sound-processing portion 25 creates a sound to be broadcasted into the planetarium facility. The created sound is broadcasted into the planetarium facility through the speaker with microphone 6.

Figure 3:
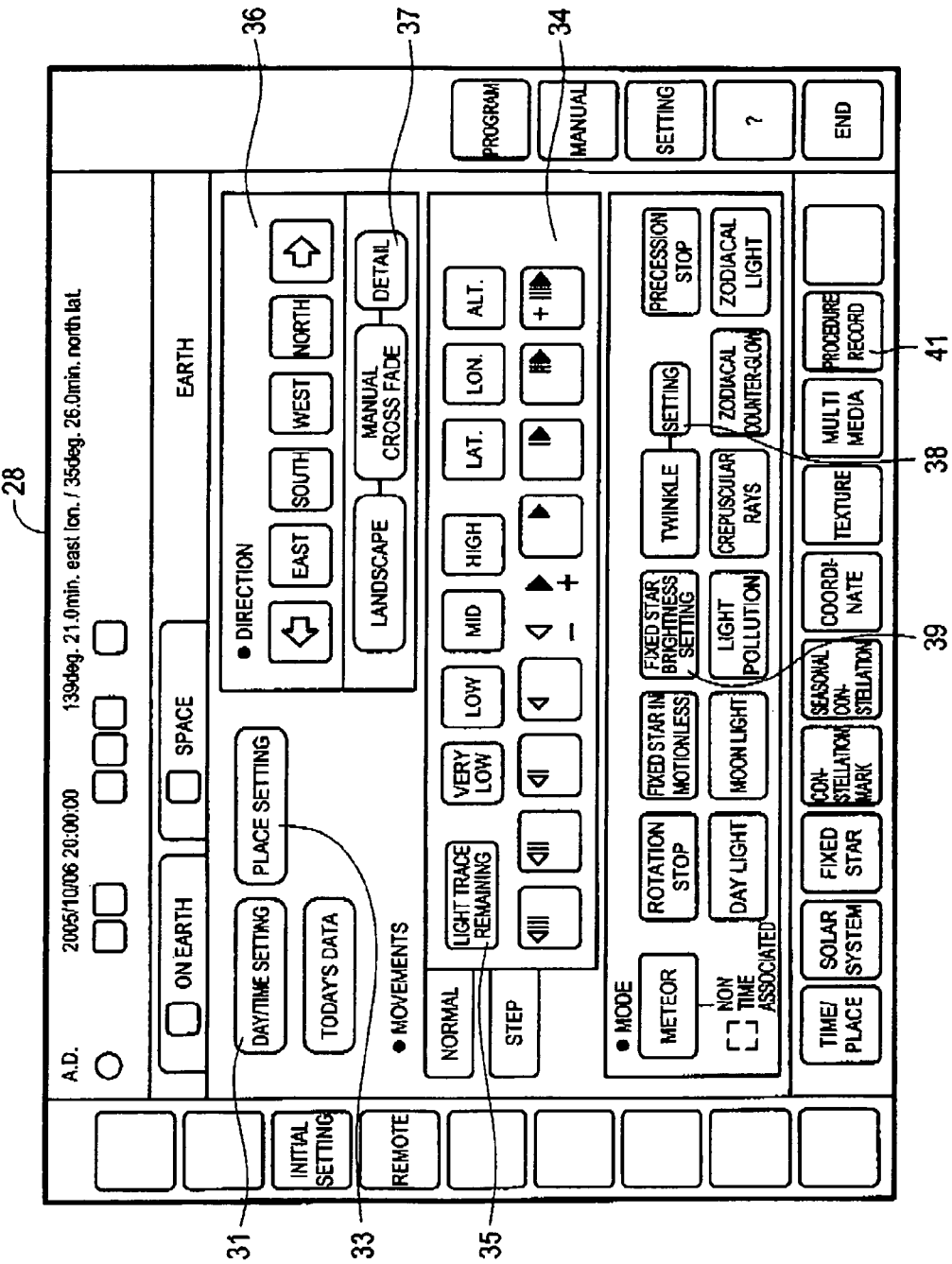
FIG. 3 is an explanatory diagram showing an example of a planetarium operation screen.

The operating portion 5 comprises an input unit 26, a machine IF portion 27, a control display panel 28, and a manual process recording portion 29. The input unit 26 corresponds to input units such as a volume knob for changing time/longitude/latitude/direction, star brightness, and a three-dimensional coordinate input unit like a joystick. The machine IF portion 27 corresponds to an interface between the operating portion 5 and the picture control portion 2. The control display panel 28 is a touch panel which is operated by the operator, containing display function and input function. The manual process recording portion 29 records each process in which an operator controls the control display panel 28 including its sequence as a procedure record. Each process will be described below. The operating portion 5 includes hard keys such as a power switch, hard switches for turning on/off various picture projection display, The planetarium picture-projecting apparatus can project a starry sky onto the dome screen 1 by operating the operating portion 5 so as to execute representation of the planetarium. At this time, a variety of control buttons are displayed on the operation display panel 28 as shown in FIG. 3. The operator progresses with the representation by operating the control button displayed on the operation display panel 28, the input unit 26 such as the joystick so as to change projected pictures appropriately with broadcasting a narration. These operations are equal to an operation of a conventional planetarium picture-projecting apparatus.

Next, typical operations (instruction) of the operating portion 5 and conditions of displayed touch panel will be described.

Figure 4:
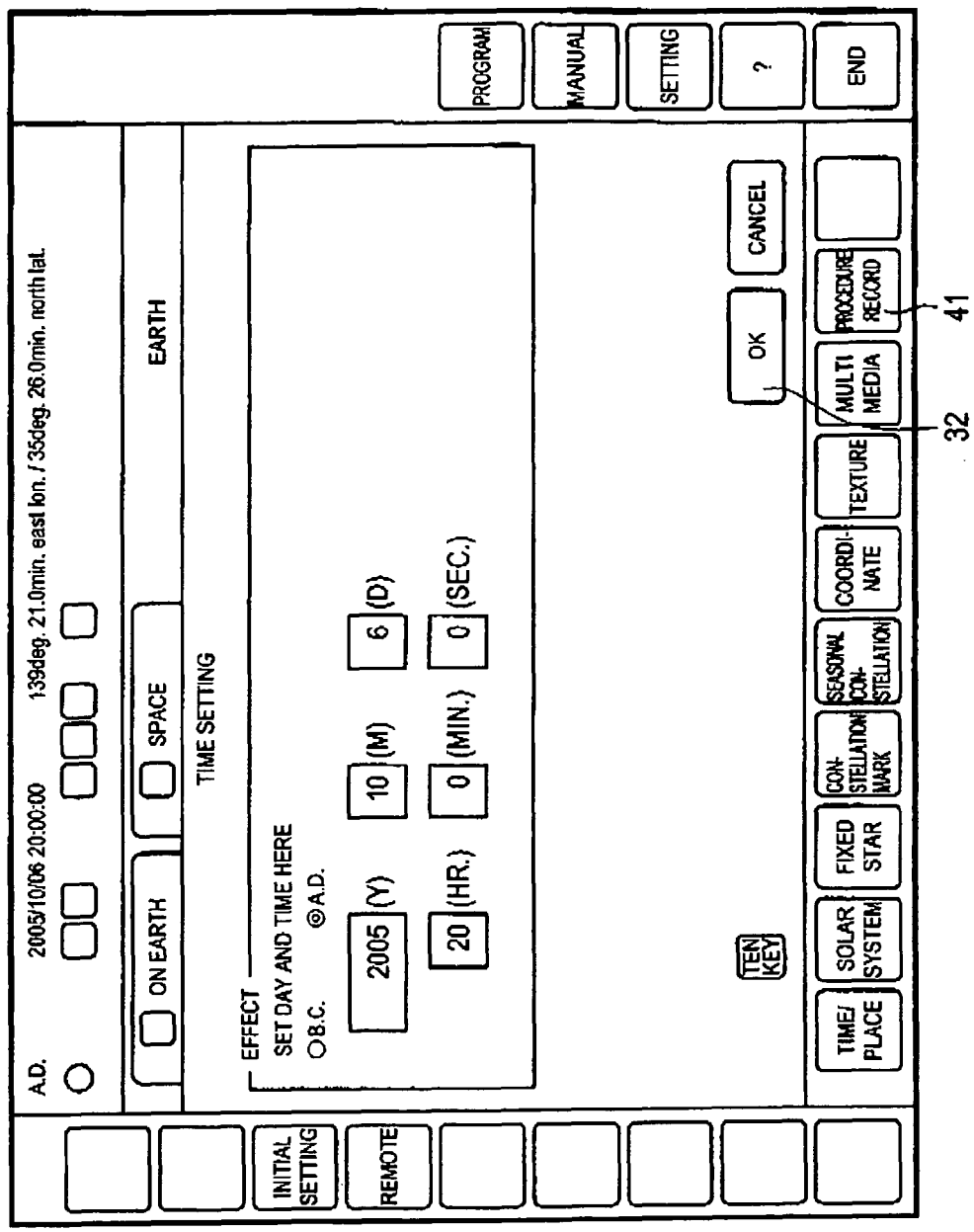
FIG. 4 is an explanatory diagram showing an example of a time setting screen.

First, "time setting instruction" is carried out when the operator selects a day/time setting button 31 from respective buttons displayed on the operation display panel 28 as shown in FIG. 3 and presses it. Consequently, the display on the operation display panel 28 is changed as shown in FIG. 4 thereby enabling input of a day/time. Here, data is set to project a sky condition at 8:00 PM, Oct. 6, 2005. When a desired numeral is inputted to each numeral column and an OK button 32 is pressed, the display returns to that of FIG. 3. A series of operations from pressing of the day/time setting button 31 in FIG. 3 to pressing of the OK button 32 including input of each numeral in FIG. 4 is time setting instruction.

In the meantime, a display of the content of "effect" column and instruction column above it in FIG. 4 differs depending on the kind of the instruction. Further, the numeral input column of FIG. 4 does not accept any numeral out of a setting possible range like a negative number.

In "place setting instruction", the operator presses a place setting button 33 shown in FIG. 3. Consequently, a place setting screen is displayed on the operation display panel 28. This is a screen obtained by changing the effect column in FIG. 4 to an item for place setting. For example, a place based on the longitude and latitude can be set by inputting an appropriate numeral through this screen. As a result, a place (position on the earth, that is, position of an observer) from which a projected starry sky is to be seen is set.

In "time change instruction", one of the speed change buttons 34 shown in FIG. 3 is pressed by the operator. Consequently, the speed can be selected from +1 to +4 (advancing time) or −1 to −4 (setting back time) and a projected setting time can be changed by continuing to press the speed change button 34 or inputting a numeral. The time of a projected picture is changed at a predetermined speed while the operator continues to press this speed change button 34. If a light trace remaining button 35 has been pressed for light trace remaining effect setting at this time, movement of each star is displayed with its light trace. Alternatively, the time change instruction may be constituted of a time before a change including year, month and day, a change speed since the time before the change, and actual time interval in which time changes.

Further, there are available "display ON instruction" and "display OFF instruction" for various pictures to be projected. These are used in displaying constellation lines, celestial body names and the like in a state overlapping a starry sky. The various projected pictures mentioned here include a fixed star image, planet image, light trace, constellation line, constellation picture, celestial body name, constellation name, celestial equator and other line images.

"View point movement instruction" is an instruction for moving the view point including a view point start position before move including sight line direction, a time until the move ends since the move starts and a moving speed. This instruction is used in representation of approaching a specified celestial body or feeling a pseudo space travel.

Although the time change instruction and view point movement instruction can be set up by inputting each numeral into the operation display panel 28, they can be executed through a variety of the input units 26. That is, they can be set up using a hard switch, volume knob, joystick and the like provided on the operating portion 5 while seeing the starry sky.

There are other instructions which can be selected in the display condition of FIG. 3, for example, setting of direction (direction button 36), setting of landscape and day/night cross fade (landscape setting button 37), setting of twinkle cycle and amplitude (twinkle setting button 38), setting of brightness of a fixed star (fixed star brightness setting button 39) and the like. Because other display screens which can be reached by pressing outside frame buttons, tabs and the like have various buttons, a representing effect can be raised by executing a variety of instructions.

Subsequently, the procedure recording function will be described. In the planetarium picture-projecting apparatus of this embodiment, each instruction executed as described above is set as a process and a series of the processes can be recorded as a procedure record in the manual process recording portion 29. The automatic representation can be executed according to a recorded procedure record. The process mentioned here refers to a combination of each instruction which is an operation procedure of the planetarium picture-projecting apparatus and a standby time which is a time period from execution of an instruction to execution of a next instruction. This standby time in operating the planetarium corresponds to a time period from a moment of an instruction dispatch till a moment for the operator to press a button for a next instruction. Each process is constituted of a combination of the standby time, i.e., from an instruction dispatch till a start of a next process, and data such as numerals necessary depending on the kind of instructions. Then, in the procedure record recorded in the manual process recording portion 29, the respective processes are arranged in their execution order.

A procedure record to be recorded in the manual process recording portion 29 will be described. When a predetermined representation is executed in the planetarium picture-projecting apparatus, each process needs to be executed in a procedure following its representing content. First, an example of the procedure record will be described in FIG. 5. According to the example shown in this figure, a "time setting" instruction in that its set time is "2006/1/1 0:0:0" is recorded as a first process. In this procedure record, a place is set as a second process, a time change as a third process, celestial body name ON in a fourth process and a fifth process and so on.

FIG. 6 shows an example of data table stored as a procedure record. As shown in FIG. 6, detailed information of the process is recorded in the procedure record in the order of processes to be executed. As the detailed information of the process, standby time until a next instruction as well as instruction content is recorded. Further, screen information (hereinafter referred to as operation screen information) of the operation display panel 28 when the instruction is dispatched is also recorded. That is, as information of a process, instruction content, standby time and operation screen information are recorded in a combination.

As each instruction for the procedure recording, every instruction which can be inputted through the operating portion 5 by an operator can be included. For example, in addition to the above setting, setting of a place, setting of direction, setting of altitude, setting of display mode (setting of fixed star brightness, setting of twinkle cycle and amplitude, setting of background light and the like), setting of real time movements such as time change, view point position change, sight direction move, and setting of display ON/OFF of various projected pictures are possible.

Next, a method for recording the procedure record in the manual process recording portion 29 will be described. The procedure recording button 41 displayed as an outside frame button as shown in FIGS. 3 and 4 is pressed on the operation display panel 28 of the operating portion 5. Because this button is also displayed on a screen indicating various control buttons as shown in FIG. 3, the recording can be started from a given time point even halfway of operating the representation. Of course, the recording can be started from an initial condition of the apparatus by pressing the procedure recording button 41.

Figure 7:
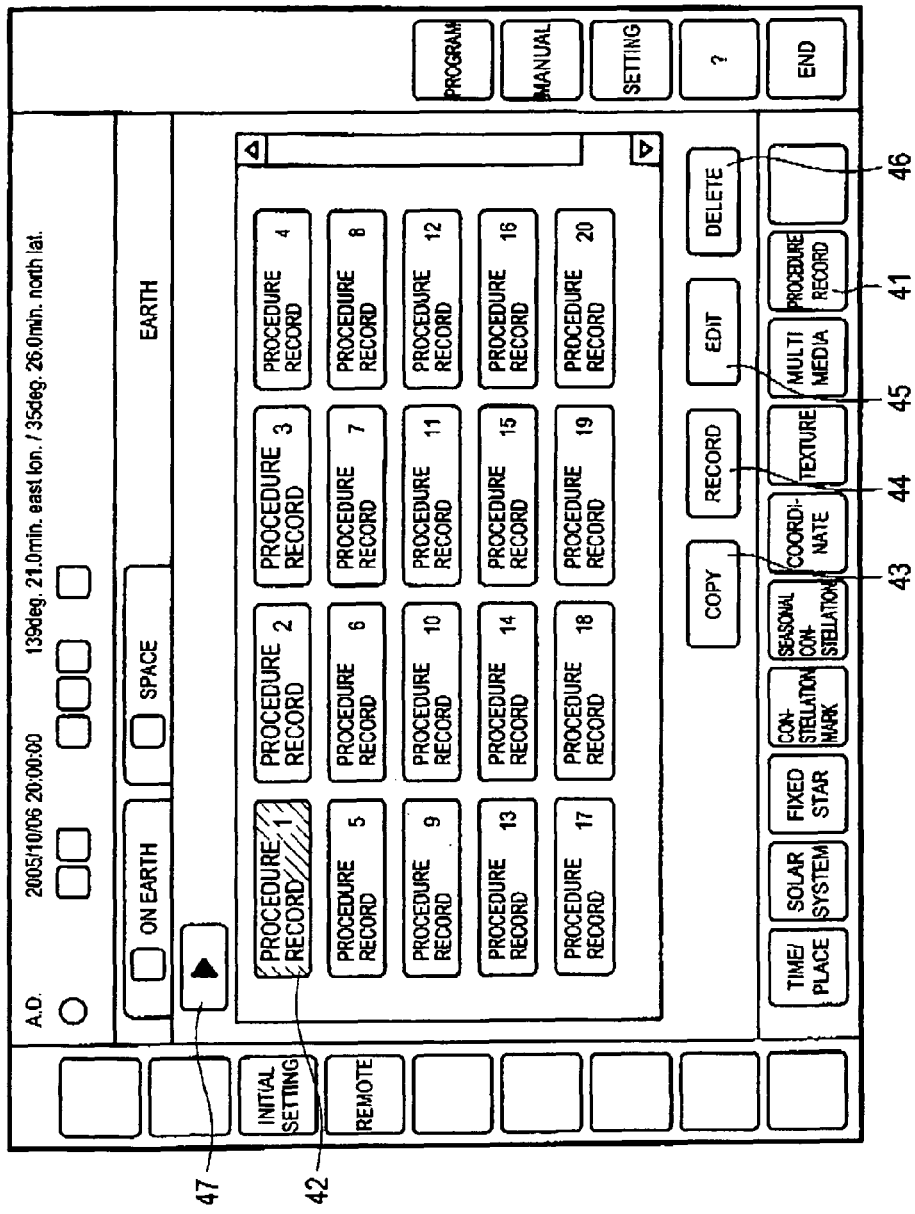
FIG. 7 is an explanatory diagram showing an example of procedure recording/execution screen.

After the procedure recording button 41 is pressed, as shown in FIG. 7, respective selection buttons 42 for procedure record 1 to procedure record 20 are displayed and then, respective buttons such as a copy button 43, record button 44, edit button 45, delete button 46 are displayed on the bottom line. An execution button 47 (black triangle directed to the right) is displayed on the left above the selection buttons 42. Any selection button can be selected by selecting a number of the procedure record. Then, the content of a procedure record whose number is selected can be copied, recorded, edited, deleted and executed. In the meantime, the quantity of the procedure records is not limited to 20. If a large number of the procedure records are available, it is permissible to display them by scrolling or paging.

The character in the selection button 41 about a procedure record whose content is already kept is displayed in a larger character to distinguish from a procedure record whose content is not kept. In this example, the procedure record 1 to procedure record 3 are expressed in larger characters because contents are already stored therefor. Whether or not there is a content may be indicated with the shape of a button or color of the button as well as the size of the character. The operator presses a selection button of 42 a procedure record number to be selected through this display screen. The selection button 42 of a selected procedure record is displayed in a highlighted state. For example, when the selection button 42 of "procedure record 1" is pressed, it is displayed as shown in FIG. 7.

To record a procedure record, the recording button 44 is pressed of four soft keys on the bottom line in FIG. 7. If a process is already recorded as a content of a selected procedure record (procedure record 1 here) as shown in FIG. 7, a window for selecting adding a new procedure record to the already stored process or deleting all the already stored process to record from the beginning is displayed. Other than the above, it is permissible to cancel selection of the procedure record 1 and choose a procedure record number having no recording content from the beginning.

Figure 8:
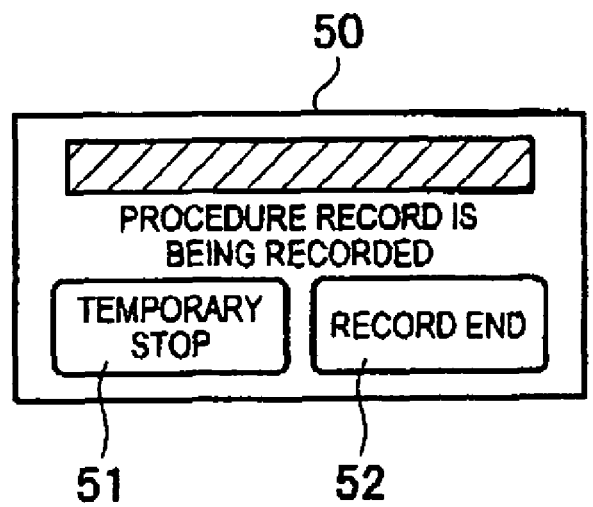
FIG. 8 is an explanatory diagram showing an example of a window for indicating on procedure of recording being performed.

When the recording is started, a procedure record recording window 50 shown in FIG. 8 is displayed on the corner of the operation display panel 28 indicating that the recording mode is ON. With this condition, the operator carries out the same operation as that to an ordinary planetarium picture-projecting apparatus. Then, each operation instruction executed by the operator during a recording operation is acquired by the manual process recording portion 29. Further, a time interval for pressing the instruction button is automatically acquired. These are recorded together with operation screen information as a process. Further, a procedure record including an execution order of respective processes is created and recorded in the manual process recording portion 29 while its procedure record number is registered.

If an operation using the joystick is carried out for view point movement or the like as well as an instruction with a button, its operation amount is converted to numerical data and recorded. Consequently, the procedure of a view point change in cosmic space generated from celestial body information having three-dimensional coordinate can be recorded. If an operation using a volume knob for time change or the like is carried out, its operation amount is converted to numerical data and recorded. Consequently, the procedure of time change in cosmic space generated from celestial body information having three-dimensional coordinate can be recorded.

Basically, the operation by the operator on recording mode is equal to that of ordinary planetarium picture-projecting apparatus. Thus, an ordinary operation screen as shown in FIG. 3 or 4 is displayed on the operation display panel 28 according to an operation by the operator. The procedure record recording window of FIG. 8 is displayed in an overlapping state on the left or right at the top of this operation screen. Because this procedure record recording window 50 is displayed in a small size, it does not provide an inconvenience to the operation when it is displayed overlapping a screen in which various control buttons are displayed Furthermore, this procedure record recording window 50 may be constructed to be movable by the operator. That is, the operator does not need to acquire any special operation or technique for recording the procedure record but only has to carry out ordinary planetarium picture-projecting operation corresponding to the content of representation.

A temporary stop button 51 and a record end button 52 are displayed in the procedure record recording window 50 as shown in FIG. 8. If a time for considering a next recording process is desired during recording, the recording of the procedure record can be interrupted by pressing the temporary stop button 51. If not interrupted, that time period is recorded as a standby time. To stop recording by terminating processes desired to be recorded, the record end button 52 is pressed. When the record end button 52 is pressed, this window 50 is closed so that the screen returns to the procedure record selection screen shown in FIG. 7.

Figure 9:
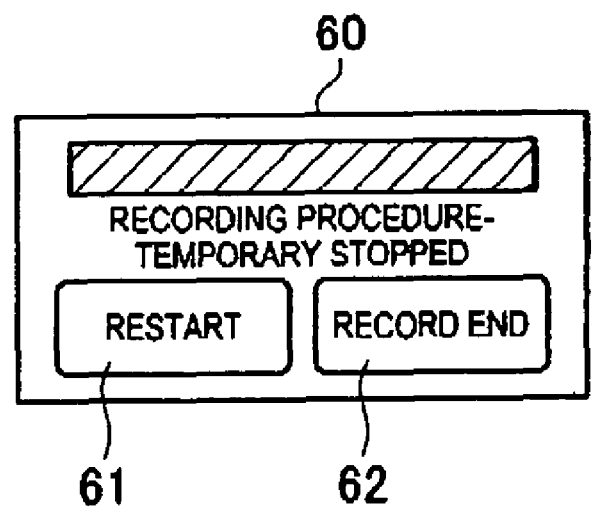
FIG. 9 is an explanatory diagram showing an example of a window indicating on temporary stop of procedure recording.

When the temporary stop button 51 is pressed, the procedure record recording window 50 is changed to a procedure record temporary stop window 60 as shown in FIG. 9. This window includes a restart button 61 and a recording end button 62 so as to be able to select whether the recording is restarted or stopped. When the restart button 61 is pressed, the recording mode is gained again so that the procedure record recording window 50 is displayed. When the recording end button 62 of FIG. 9 is pressed, this window 60 is closed so that the screen returns to the procedure record selection screen shown in FIG. 7. In the meantime, a process number being recorded, total projection time of the record and the like may be displayed in these windows 50 and 60.

A narration can be recorded through the speaker with microphone 6 at the same time as recording of the procedure record. Further, a recorded content may be converted to text data through voice recognition and the text data may be recorded corresponding to each process of the procedure record. A procedure record whose recording is finished may be provided with a name in order to make it understood easily later. A total time since start of recording may be displayed in the procedure record recording window 50 or the procedure record temporary stop window 60.

Figure 10:
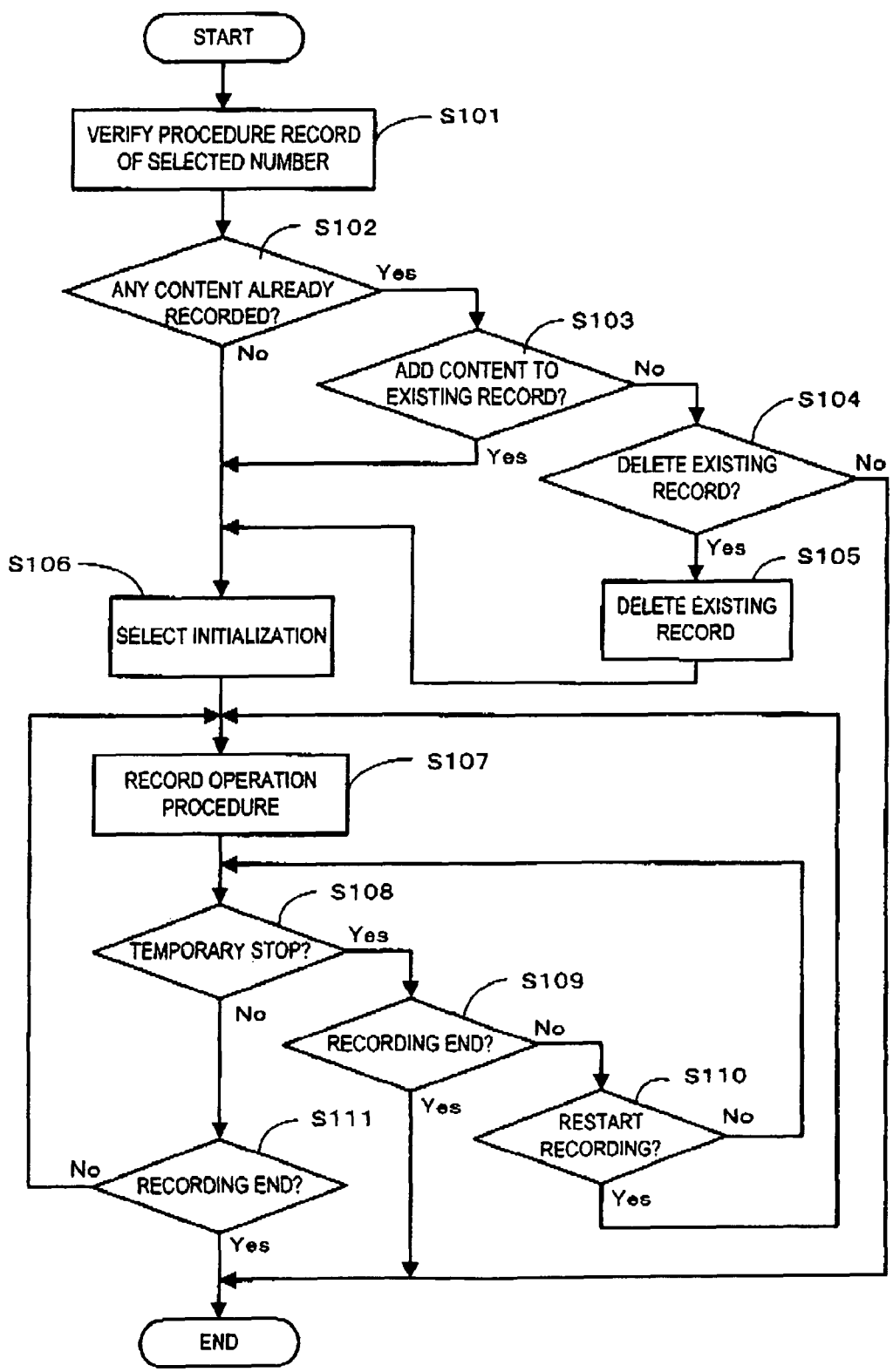
FIG. 10 is a flowchart showing procedure recording processing.

Next, the record processing of this procedure record will be described with reference to the flowchart of FIG. 10. If a procedure record number is selected in the procedure record selection screen of FIG. 7 and the record button 44 is pressed, this processing is started. When this processing is started, the system verifies whether or not there is a content already recorded in the procedure record of a selected number (S101).

Unless there is any recorded content (S102: No), a new content may be recorded into the procedure record of this number from the beginning.

However, if any content is already recorded (S102: Yes), the system asks the operator whether it is recorded in addition to the existing record (S103). Unless that content is added (S103: No), the system asks the operator whether that record is to be deleted (S104). If the deletion is permitted (S104: Yes), the content of that procedure record is deleted (S105). If it is not to be deleted (S104: No), this processing is ended because the procedure record number needs to be selected again. Executing such a processing prevents an existing procedure record from being changed by erroneous operation. Further, because after recording a content up to its halfway, it is possible to select recording of a subsequent portion in addition to the procedure record, freedom of operation procedure editing is high.

Unless there is any existing record (S102: No) or if a content is added to the existing record (S103: Yes) or deleted (S105), whether or not initialization is carried out is selected (S106). The initialization mentioned here means bringing back to initial setting condition about day/time, place and other optional representations. Selecting of the initialization can save an operation of returning various settings to their original conditions. Further, not selecting of the initialization can reflect a projection condition just before upon a record, If a content is added (S104: Yes), selection of a portion to be added may be permitted. Then, operation procedures which are inputted by the operator are recorded in order into the procedure record (S107).

At this time, the procedure record recording window 50 shown in FIG. 8 is displayed. Then, whether or not the temporary stop button 51 is pressed is determined in the procedure record recording window 50 (S108). If the temporary stop is selected, standby condition is raised until an instruction for restarting is dispatched by pressing the restart button 61 shown in FIG. 9 (S110: Yes). When the record end button 52 is pressed (S111: Yes) or the record end button 62 is pressed (S109: Yes), recording of this procedure record is slopped, so that this processing is terminated and the window 50 or 60 is closed. The description of this processing ends here.

Figure 11:
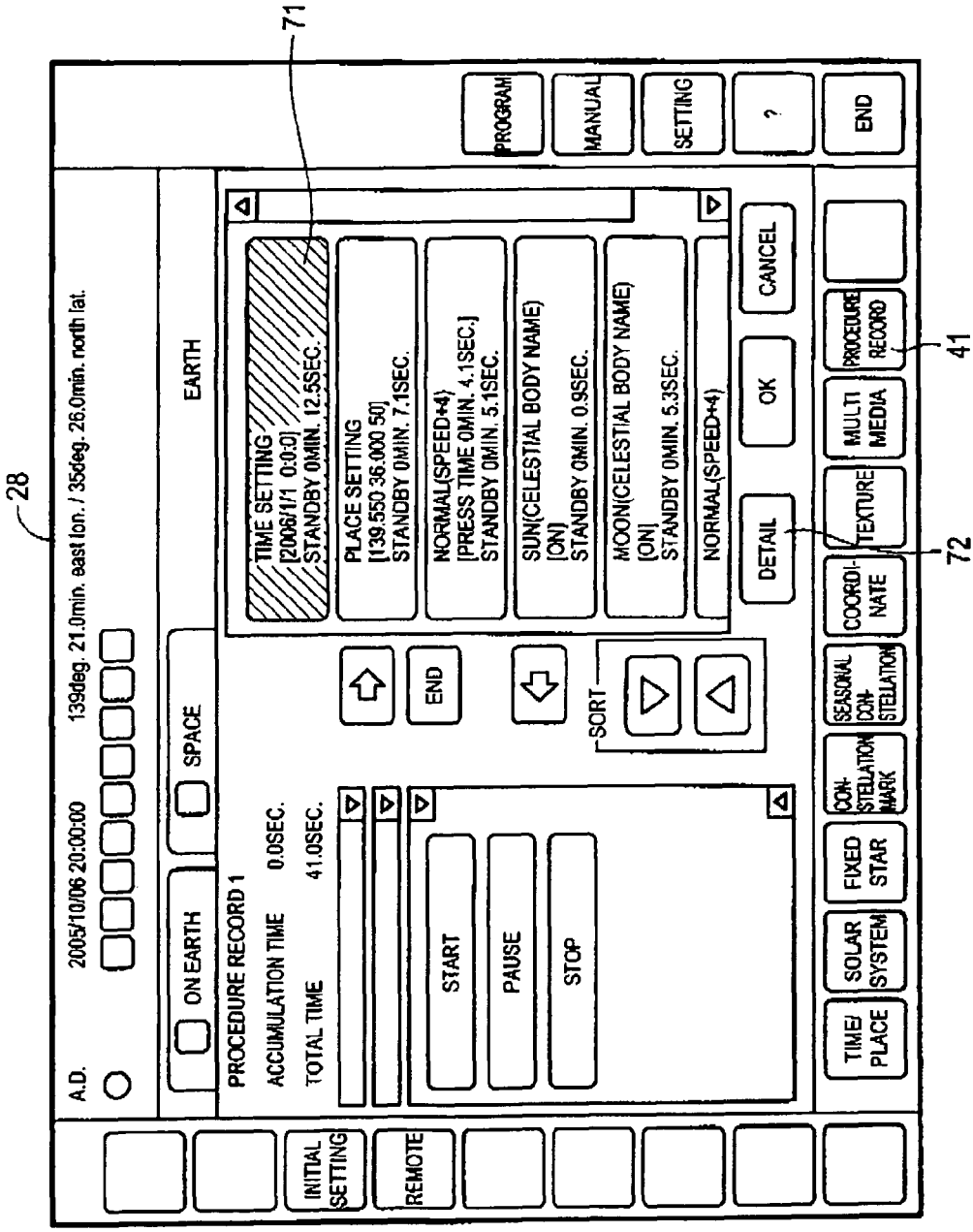
FIG. 11 is an explanatory diagram showing an example of a procedure recording display screen.

Next, a method of editing the procedure record compiled in this way will be described. When the procedure record 1 expressed with larger characters is selected on the procedure record recording screen as shown in FIG. 7, the edit button 45 is pressed. Assuming that a content shown in FIG. 5 is recorded as this procedure record 1, the procedure record edit screen is displayed on the operation display panel 28 as shown in FIG. 11. Respective processes are displayed on the right column in the center of FIG. 11 in execution order.

Figure 12:
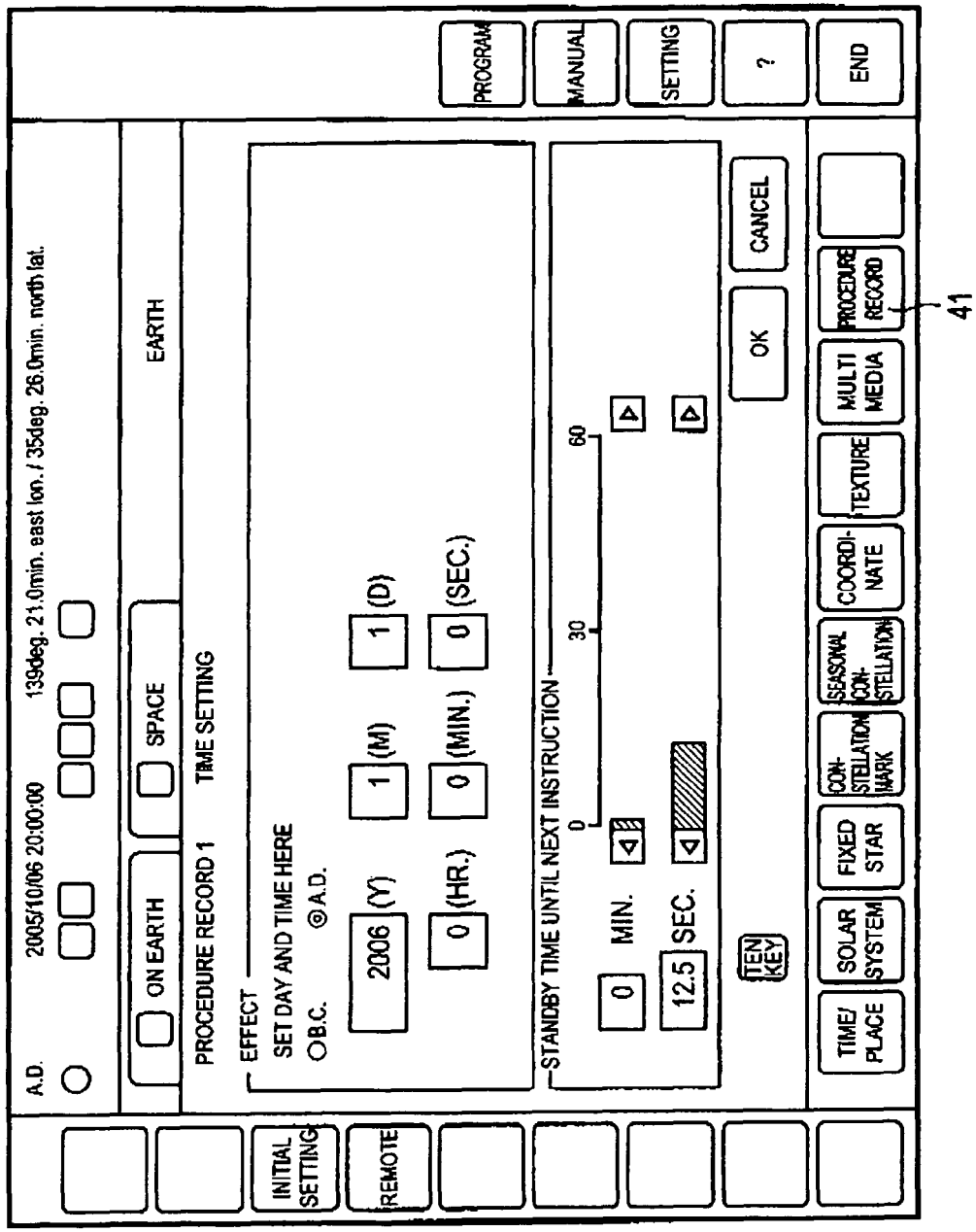
FIG. 12 is an explanatory diagram showing an example of a procedure recording detailed display screen (time operation edit)

To edit the content of time setting process 71 as a first process, this button is pressed to gain the selection condition shown in the figure. If a detail button 72 is pressed next, a detailed setting content is displayed as shown in FIG. 12. With this condition, time setting, standby time and the like can be determined in detail. Thus, the operator can concentrate on his operation without taking care of an interval between operations at the time of recording. Further, the operator can record in a short time without consuming much time between instructions and set an appropriate standby time by editing.

Motion speed can be changed between −100% and 100% regarding the longitude, latitude, direction and the like. To change a setting value, a number may be inputted through a keyboard or ten-key or a slide bar or radio button may be used. Further, any registered landscape, space travel, automatic program and the like may be selected from a pull-down menu to change the setting condition.

Figure 13:
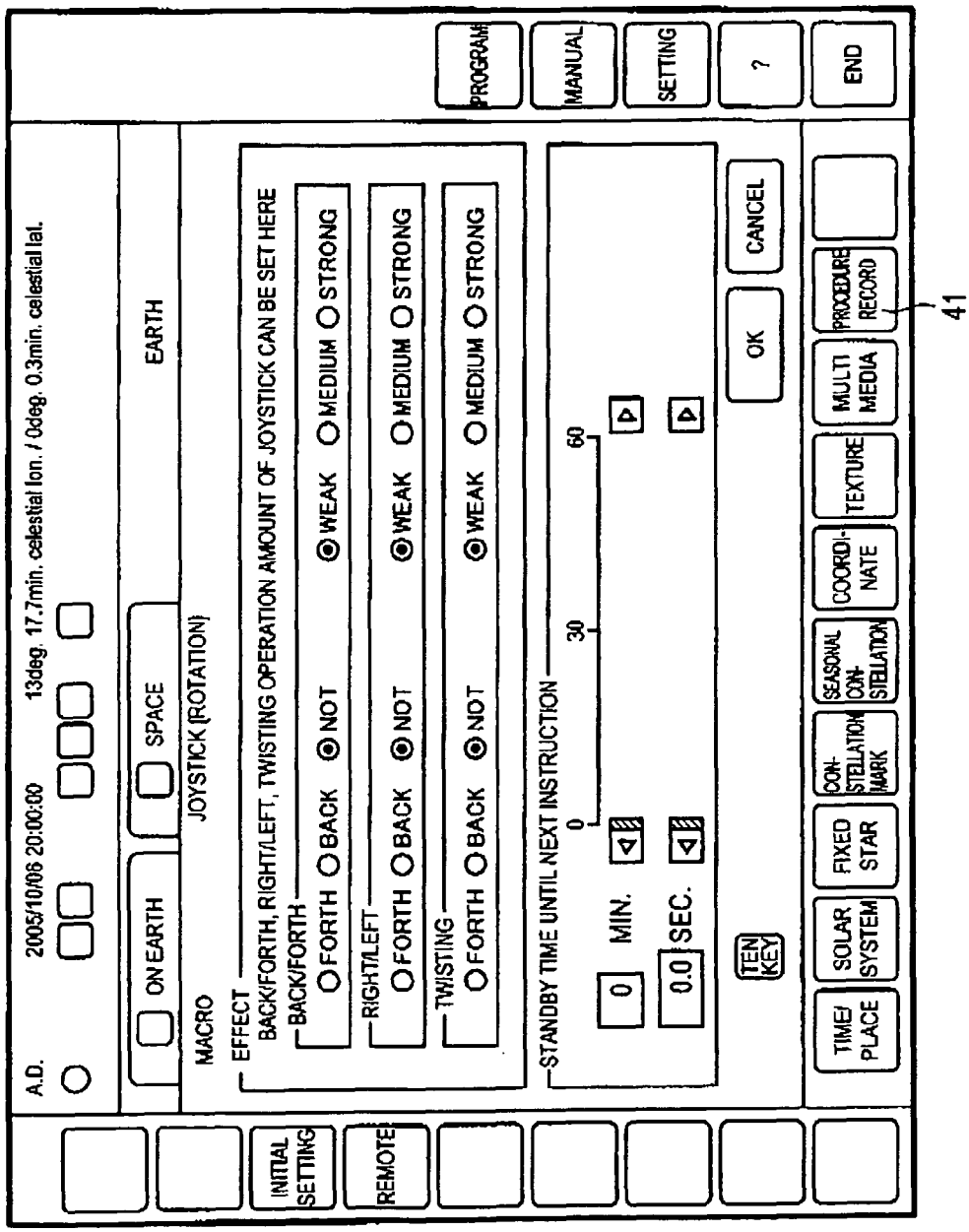
FIG. 13 is an explanatory diagram showing an example of the procedure recording detailed display screen (joystick operation edit)
Figure 14:
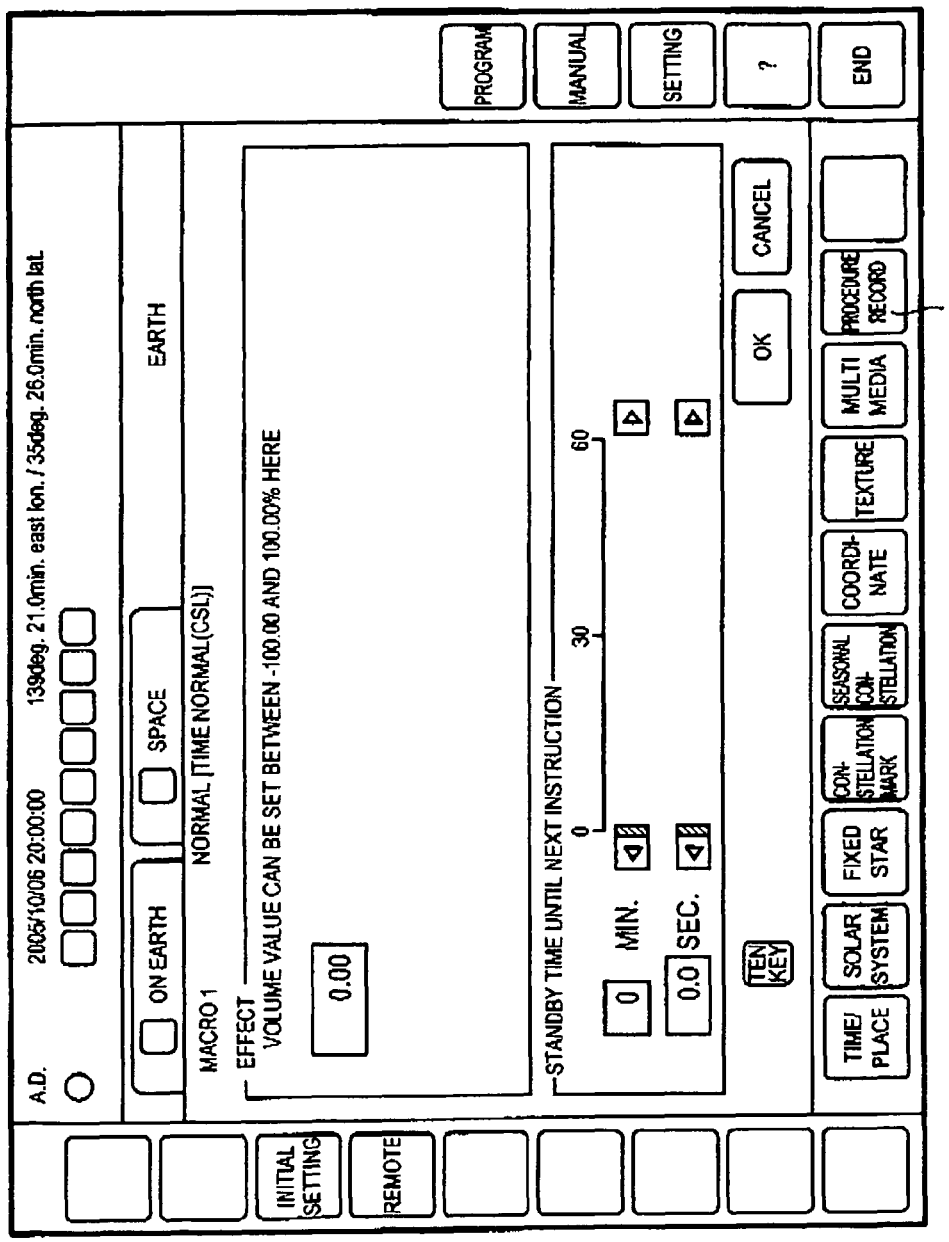
FIG. 14 is an explanatory diagram showing an example of the procedure recording detailed display screen (volume knob operation edit)

For such an input unit 26 as the joystick, it is possible to record a rough operation amount and after that, set an accurate value. For example, when adjusting the operating amount of the joystick, a detailed setting content as shown in FIG. 13 is displayed. With this condition, the back/forth motion, right/left motion, twisting direction and their inclination and intensities of the joystick can be adjusted accurately. When the operation amount of each volume knob is adjusted, a detailed setting condition as shown in FIG. 14 is displayed. With this condition, an instruction value (rotation position) of each volume knob can be adjusted accurately.

The procedure record editing screen shown in FIG. 11 enables change of each process order, deletion of a recorded process, insertion of a not recorded process and other edition. If a narration is recorded together with the procedure record, that narration content can be edited. It is possible to produce a narration text data and record it in correspondence to each process or fetch narration data from a portable medium or the like. Other than the above, part is of a process recorded in other procedure record may be copied and combined or inserted.

Thus, it is easy to record basic representing components as procedure record corresponding to each number and configure a new representation by replacing only with a special portion so as to record it as a procedure record of a different number. For example, a content of a procedure record already recorded is copied to a procedure record of a different number using the copy button 43 in FIG. 7 and only the special portion recorded additionally is inserted into an appropriate place. Other than the above, if an operation frequently carried out such as initial setting is set as a procedure record, the initial setting is carried out only by executing that procedure record thereby facilitating operation of a routine work.

"Total time" necessary for execution of the procedure record is displayed based on a standby time recorded in the procedure record on the procedure record edit screen shown in FIG. 11. The total time is changed corresponding to deletion, addition or edition of process. If a process is selected, "accumulation time" until that process is started, that is, a time period until that process is started after the execution of the procedure record is started is displayed.

Figure 15:
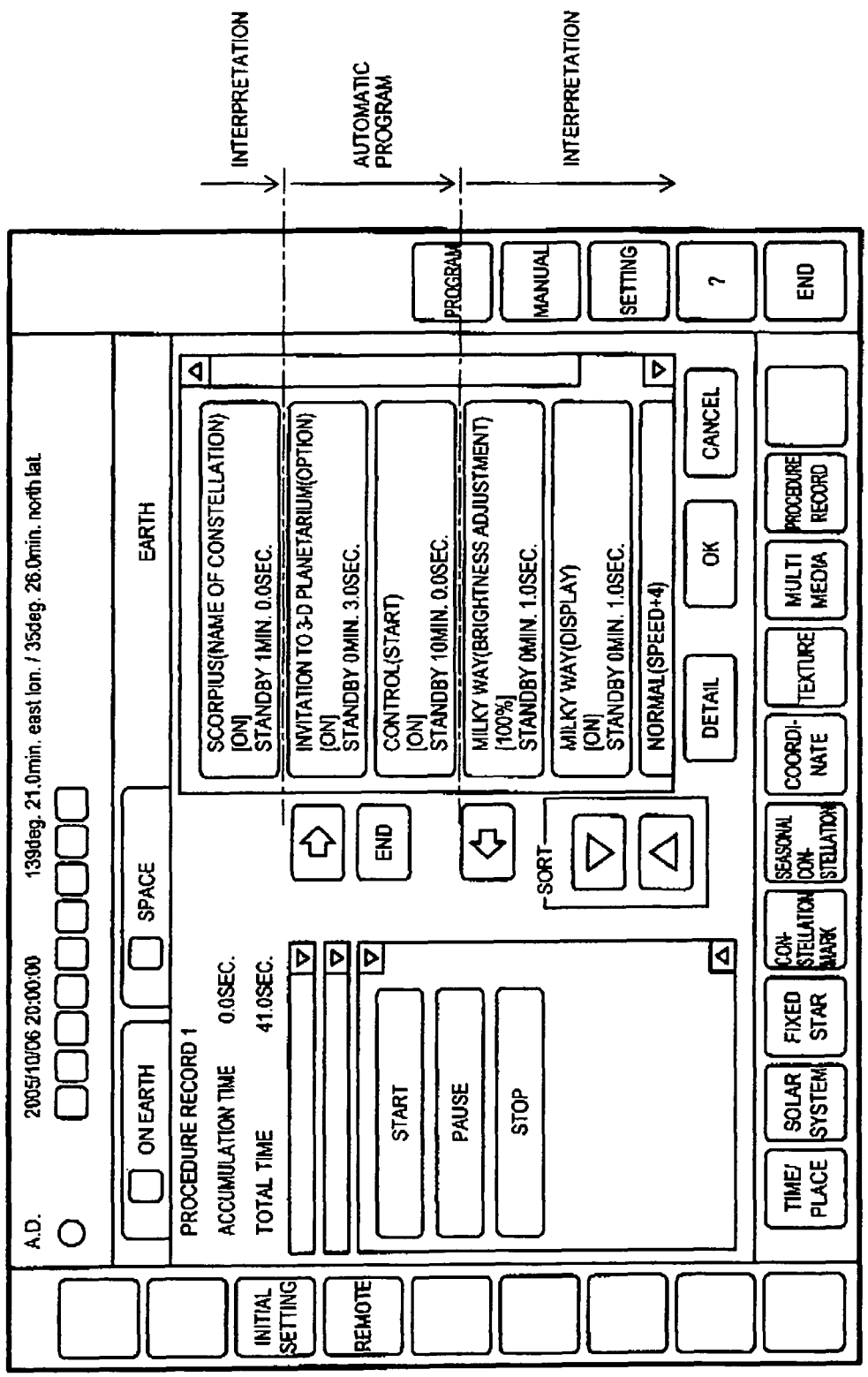
FIG. 15 is an explanatory diagram showing an example of the procedure recording display screen (standby for automatic program insertion)

Further, automatic program (for example, short movie) constituted of animation and sound can be inserted into halfway of representation. FIG. 15 shows an example of a procedure record in which automatic program is inserted. Here, an automatic program named "invitation to 3D planetarium" is selected in a second process and that program is started in a third process. The standby time for the third process (corresponding to a time period until a next process is started after projection is started) is set to 10 minutes because this program takes 10 minutes or shorter. Therefore, when the procedure record of this figure is executed, (1) display of constellation name of Scorpius (await for a minute), (2) selection of automatic program (await for three seconds), (3) picture projection of automatic program (await for 10 minutes), (4) adjustment of brightness of the Milky Way (await for a second), (5) display of the Milky Way (await for a second) and so on are automatically executed in order. Furthermore, a narration is added at (1) and after (4).

Figure 16:
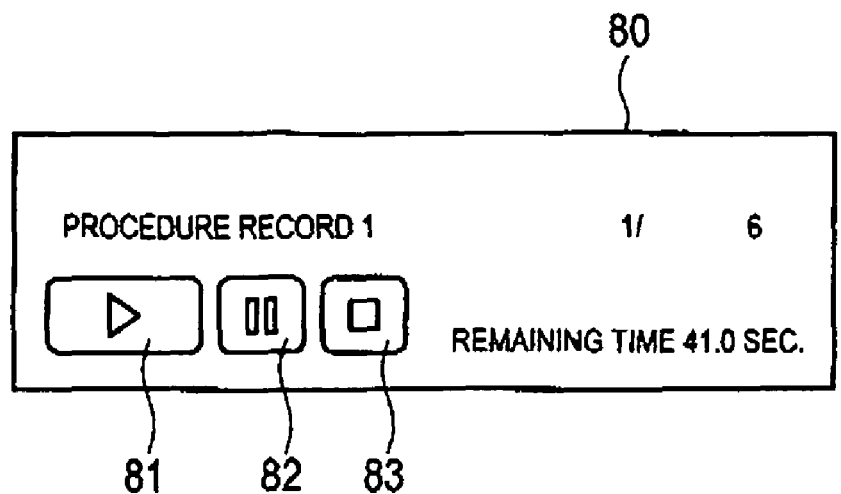
FIG. 16 is an explanatory diagram showing an example of a window indicating on execution of procedure recording.

Next, a method of executing the procedure record recorded in this way will be described. A procedure record number displayed in a larger character on the procedure record selection screen shown in FIG. 7 is selected and the execution button 47 on the left of the upper portion of this figure is pressed. For example, when the procedure record 1 is selected and executed, a procedure record execution window 80 shown in FIG. 16 is displayed on the corner of the screen of the operation display panel 28 thereby indicating that the procedure record 1 is being executed. This figure indicates that a first process of six processes recorded in the procedure record 1 is being executed.

At this time, an operation screen of a process being executed is automatically displayed on the operation display panel 28 following a progress of the procedure record. This is equal to a screen displayed when an operation based on each instruction is carried out in the ordinary planetarium operation. For example, if a procedure record shown in FIG. 11 executes a recorded procedure record, first, a time setting process is executed. At this time, a time setting screen shown in FIG. 12 is displayed and the procedure record execution window 80 shown in FIG. 16 is displayed on the corner on the left or right of the upper portion of the screen in an overlapping state.

The display of the operation display panel 28 is automatically changed over following a progress of the execution of the procedure record 1. That is, because an operation screen of a process being executed at that time is always displayed, the operator can always confirm the setting of a process being executed. Therefore, the operator can progress representation easily with a comment while confirming a progress of projection of picture.

Automatic change-over of the operation display panel 28 is carried out based on operation screen information (see FIG. 6) stored as the procedure record. That is, when executing each instruction, operation screen information is read out and that instruction is executed after the display of the operation display panel 28 is changed over.

In the meantime, the method of achieving automatic change-over of the operation display panel 28 is not limited to methods of recording operation screen information in the procedure record. For example, when storing the procedure record, it is possible to create a screen record which records screen transition of the operation display panel 28. When executing the procedure record, that screen record can be executed at the same time. FIG. 17 shows an example of data stored as screen record. As shown in FIG. 17, the screen record is recorded using program language and a standby time until a next screen change-over is also recorded with a screen setting instruction. That is, in this method, execution of the procedure record and execution of the screen record are carried out in parallel.

If a narration character data is recorded corresponding to each process, as shown in FIG. 18, a content of the narration may be displayed in characters on part of the operation screen of a process. Consequently, even an unskilled operator can grasp the content of a narration achieved in each process with execution of that process, thereby progressing the representation smoothly.

When executing the procedure record, it is recommended to load an operation screen for a next process during a remaining part of a standby time after execution of a process. That is, the procedure record as shown in FIG. 19 is stored so as to calculate a time until execution of each process after the execution is started. When the procedure record of totally 15 seconds is executed, a following difference exists between a case where a next operation screen is loaded during a standby time (FIG. 20A) and a case where a next operation screen is loaded after the standby time (FIG. 20B). Because the operation screen is loaded after the standby time in FIG. 20B, start of the execution delays by a corresponding time of loading. This delay is a significantly short period which usually is less than 100 ms. However, the more processes, the more often representing timing deviates because this time is accumulated in each process. For example, in case of FIG. 20, delay time of loading the operation screen is accumulated in four processes except a first process (first process) and a process which is executed at the same time (fifth process). On the other hand, in FIG. 20A, no delay occurs in loading the operation screen because a next operation screen is loaded during a standby time. Thus, the representation can be carried out more accurately to time.

As shown in FIG. 16, an execution button 81, a temporary stop button 82 and a stop button 83 and the like are displayed in the procedure record execution window 80 displayed when the procedure record is being executed. Thus, an instruction by manual operation can be inserted by pressing the temporary stop button 82 to stop execution of the procedure record 1. By selecting a process through the procedure record display screen shown in FIG. 11, the procedure record may be executed from hallway thereof. That is, because a specific process can be skipped or the same process can be repeated, ad-lib operations can be inserted at the time of the execution.

It is possible to display more buttons in the procedure record execution window 80 so as to enable fast-forward, rewind, slow motion or the like in addition to temporary stop and restart. Further, in addition to executing the procedure record, movement of view point and change of sight direction can be achieved in some processes by operating the joystick. A representation by the digital planetarium picture-projecting apparatus can be automatically executed if instructions about selection of a procedure record number and start of the execution are ended. In this case, it is recommended to record a voice so as to automatically broadcast a narration. In this case, the operating portion 5 and the input unit 26 such as the joystick may be separated so as to prevent erroneous operation by spectators or the like.

As shown in FIG. 16, a remaining time until the end of representation is displayed based on a standby time recorded in the procedure record in the procedure record execution window 80. Consequently, the operator can confirm time of representation easily. Further, the total time necessary for execution of the procedure record, the time necessary for each process and the remaining time and the like may be displayed.

By the way, since this embodiment enables to edit the procedure record separately from the planetarium operation, an instruction order which cannot be executed actually can be introduced in. If an ad-lib operation is executed halfway of execution, such a thing can occur. For example, this includes a case where an instruction which cannot be executed on cosmic mode although it can be executed on ground mode is inserted into execution of cosmic mode. In such a case, the process which includes a process that cannot be executed is skipped without stopping that process as an error so as to proceed to a next process and continue the execution.

In the digital planetarium picture-projecting apparatus of this embodiment as described above in detail, by selecting a procedure record number and inputting a record instruction, a subsequent operation is automatically recorded and registered. An input method by the operator is equal to that of the ordinary planetarium picture-projecting apparatus and no special programming technique does need to be acquired.

In this embodiment, temporary stop operation by an operator during recording of the procedure record or restart operation by the operator during the temporary stop can be executed. Thus, the recording of the procedure record can be interrupted, so that even if an operator cannot operate a representation smoothly, he can record easily. For example, the operator can confirm a next operation by interrupting the procedure record.

Further, when recording of the procedure record is started, the operator can select whether it is started from a projection condition just before a starting operation or started from an initial projection condition by deleting the projection condition just before the start operation. Thus, the operator can select whether or not there is reflected the projection condition just before the start operation upon a record.

According to this embodiment, when recording of the procedure record is started, it is checked whether or not there is an operation procedure already recorded and if it is detected that the recorded procedure record exists, the operator is capable of selecting whether it deletes that recorded procedure record and records newly or records by adding to the recorded procedure record. Thus, this prevents an existing procedure record from being changed by erroneous operation. Further, after the operator records a procedure record up to halfway, he can select recording of a subsequent procedure by adding to that procedure record, thereby raising freedom of edit of the procedure record.

Further, according to this embodiment, a standby time until processing by a next operation is started after processing by a present operation is ended is included in the content of procedure record to be recorded and further, the standby time during recording of the already recorded procedure can be changed through operation by the operator. Thus, not only the operation can be executed continuously but also an appropriate time interval can be provided between an operation and another operation. Further, because the standby time can be edited, the operator does not need to take care of a time between operations during recording and thus, he can concentrate himself upon the operation.

According to this embodiment, information about a screen currently projected is displayed on the display screen during reproduction of the procedure record and a display content is changed with a progress of reproduction. Thus, when a recorded procedure record is reproduced, a reproduction position is easy to be grasped because information about that operation is displayed on the display screen. Further, by changing over the display screen with progress of reproduction, a display screen at the time when a final operation is executed can be maintained when the reproduction is ended or interrupted. Thus, the operator can shift to manual operation smoothly.

In this embodiment, a narration content of each step is recorded with the procedure record and a narration of a currently projected step is displayed on the display screen during reproduction of the procedure record and then, the display content is changed with a progress of the reproduction. As a result, even an unskilled operator can broadcast an appropriate narration.

In this embodiment, a change operation by the operator about execution of picture projection is accepted during reproduction of the procedure record. For example, temporary stop or restart can be selected during reproduction of the procedure record. Thus, an ad-lib operation by the operator can be inserted in a stop period. Thus, as well as automatic representation by reproducing a recorded content as it is, the change operation by the operator is possible.

Further, this embodiment contains the input unit 26 for changing information about picture projection continuously and records an operation amount of the input unit 26 as the procedure record. Thus, not only simple operation such as projection ON/OFF but also an operation of changing information continuously of a rotation knob or joystick or the like can be recorded. Further, their detailed adjustment can be carried out after recording. As a consequence, the operation amount can be adjusted finely so as to achieve more accurate representation.

Therefore, the digital planetarium picture-projecting apparatus of the present invention can record and execute its operation procedure and can record easily, edit a recorded content and execute ad-lib representation when the operation procedure is executed.

In the meantime, this embodiment is just an exemplification and does not restrict the present invention to any particular one. Therefore, the present invention may be improved or modified in various ways within a scope not departing from the spirit of the invention. For example, although a single-eye type planetarium picture-projecting apparatus is shown in FIG. 1, the present invention can be applied to a multi-eye type planetarium.

What is claimed is:

1. A digital planetarium picture-projecting apparatus comprising:
    an operation accepting portion for accepting a picture-projection-related operation by an operator;
    a display screen for displaying the operator picture-projection-related information;
    an operation-order recording portion for recording an operation procedure accepted by the operation accepting portion;
    a reproducing portion for executing picture projection in accordance with the operation procedure recorded in the operation-order recording portion;
    a temporary-stop accepting portion for accepting a temporary-stop operation by the operator when an operation procedure is being recorded with the operation-order recording portion;
    a restart accepting portion for accepting a restart operation by the operator when recording of an operation procedure is temporarily stopped by the temporary-stop accepting portion and
    an ad-lib accepting portion for accepting a picture-projection-execution-related change operation by the operator when a planetarium picture is being reproduced in accordance with a recorded content by the operation-order recording portion.

2. The digital planetarium picture-projecting apparatus according to claim 1, wherein a change operation accepted by the ad-lib accepting portion includes at least one of following operational items: extending or shortening standby time; temporary stop; restart; rewind; fast-forward; slow motion; movement of view point; change of sight direction; display-ON/OFF for each picture to be projected; skip of an operation; and insertion of an arbitrary operation.

3. A digital planetarium picture-projecting apparatus comprising:
    an operation accepting portion for accepting a picture-projection-related operation by an operator;
    a display screen for displaying the operator picture-projection-related information;
    an operation-order recording portion for recording an operation procedure accepted by the operation accepting portion;
    a reproducing portion for executing picture projection in accordance with the operation procedure recorded in the operation-order recording portion;
    an initial-state selecting portion for making the operator select whether to start from a projection condition just before a starting operation or to start from an initial projection condition by deleting the projection condition just before the starting operation when recording of an operation procedure is started by the operation-order recording portion; and an ad-lib accepting portion for accepting a picture-projection-execution-related change operation by the operator when a planetarium picture is being reproduced in accordance with a recorded content by the operation-order recording portion.

4. The digital planetarium picture-projecting apparatus according to claim 3, further comprising:

an already-recorded detecting portion for detecting whether or not there is a recorded operation procedure when the recording of an operation procedure is started by the operation-order recording portion; and a deletion selecting portion for making the operator select whether to delete a recorded operation procedure and record newly or to record by adding to the recorded operation procedure in case the already-recorded detecting portion detects a recorded operation procedure.

5. A digital planetarium picture-projecting apparatus comprising:

an operation accepting portion for accepting a picture-projection-related operation by an operator;

a display screen for displaying the operator picture-projection-related information;

an operation-order recording portion for recording an operation procedure accepted by the operation accepting portion, the operation-order recording portion making standby time which is from completion of an operation processing till start of a next operation processing included in a content of an operation procedure to be recorded;

a reproducing portion for executing picture projection in accordance with the operation procedure recorded in the operation-order recording portion;

an editorial processing portion for changing length of standby time included in a being-processed recorded operation procedure with an operation by the operator; and an ad-lib accepting portion for accepting a picture-projection-execution-related change operation by the operator when a planetarium picture is being reproduced in accordance with a recorded content by the operation-order recording portion.

6. A digital planetarium picture-projecting apparatus comprising:

an operation accepting portion for accepting a picture-projection-related operation by an operator;

a display screen for displaying the operator picture-projection-related information;

an operation-order recording portion for recording an operation procedure accepted by the operation accepting portion;

a reproducing portion for executing picture projection in accordance with the operation procedure recorded in the operation-order recording portion;

an in-execution-display control portion for displaying currently-projected-picture-related information in the display screen and changing a display content along a progress of reproduction when a recorded procedure record by the operation-order recording portion is being reproduced; and an ad-lib accepting portion for accepting a picture-projection-execution-related change operation by the operator when a planetarium picture is being reproduced in accordance with a recorded content by the operation-order recording portion.

7. The digital planetarium picture-projecting apparatus according to claim 6, wherein the operation-order recording portion records an operation procedure and screen information relating to a display content of the display screen, and the in-execution-display control portion determines a display content of the display screen based on the screen information.

8. The digital planetarium picture-projecting apparatus according to claim 6, wherein the operation-order recording portion records a display content of the display screen and standby time both of which make transition along with course of operation as an in-screen-transition procedure, apart from an operation procedure, and the in-execution-display control portion determines a display content of the display screen in accordance with the in-screen-transition procedure.

9. The digital planetarium picture-projecting apparatus according to claim 6, wherein the operation-order recording portion records a narration content of each step together with an operation procedure to be recorded, and the digital planetarium picture-projecting apparatus further comprising an in-execution-narration display portion for displaying a narration directed to a step currently projected in the display screen and changing a display content along a progress of reproduction when a recorded procedure record by the operation-order recording portion is being reproduced.

10. A digital planetarium picture-projecting apparatus comprising:

an operation accepting portion for accepting a picture-projection-related operation by an operator;

a display screen for displaying the operator picture-projection-related information;

an operation-order recording portion for recording an operation procedure accepted by the operation accepting portion;

a reproducing portion for executing picture projection in accordance with the operation procedure recorded in the operation-order recording portion;

a volume control portion for continually changing picture-projection-related information, wherein the operation-order recording portion records operational amount of the volume control portion; and an ad-lib accepting portion for accepting a picture-projection-execution-related change operation by the operator when a planetarium picture is being reproduced in accordance with a recorded content by the operation-order recording portion.

11. The digital planetarium picture-projecting apparatus according to claim 10, wherein the volume control portion is a rotatable knob, and the operation-order recording portion records rotation amount of the rotatable knob.

12. The digital planetarium picture-projecting apparatus according to claim 10, wherein the volume control portion is a joystick, and the operation-order recording portion records movement direction and inclination of the joystick.

13. The digital planetarium picture-projecting apparatus according to claim 10, further comprising a volume-change processing portion for making the operator to change recorded operation amount of the volume control portion.

* * * * *